United States Patent [19]
Elger

[11] 4,030,006
[45] June 14, 1977

[54] SPEED CONTROLLABLE DRIVE FOR AN ASYNCHRONOUS MOTOR

[75] Inventor: Harald Elger, Erlangen, Germany

[73] Assignee: Siemens Aktiengesellschaft, Munich, Germany

[22] Filed: Apr. 10, 1975

[21] Appl. No.: 566,789

[30] Foreign Application Priority Data
Apr. 16, 1974 Germany .......................... 2418332
Nov. 26, 1974 Germany .......................... 2455876

[52] U.S. Cl. ................................ 318/197; 318/237
[51] Int. Cl.² ...................................... H02P 7/36
[58] Field of Search ............... 318/46, 49, 197, 237

[56] References Cited
UNITED STATES PATENTS

| | | | |
|---|---|---|---|
| 2,201,006 | 5/1940 | Kilgore | 318/237 X |
| 3,327,189 | 6/1967 | Hedstrom | 318/237 X |
| 3,519,909 | 7/1970 | Mathias et al. | 318/197 X |
| 3,531,701 | 9/1970 | Shibata | 318/237 X |
| 3,551,767 | 12/1970 | Shibata | 318/237 X |

Primary Examiner—Gene Z. Rubinson
Attorney, Agent, or Firm—Kenyon & Kenyon Reilly Carr & Chapin

[57] ABSTRACT

A speed controllable three phase drive including an asynchronous motor having a slip ring rotor which can be connected to a three phase network and a d.c. motor mechanically coupled to the asynchronous motor with the d.c. motor fed through an uncontrolled rectifier connected to the slip ring of the asynchronous motor has a controlled static converter in series with the uncontrolled rectifier and d.c. motor. In an alternate embodiment the d.c. motor is replaced by a static converter motor fed by a controlled inverter connected to the uncontrolled rectifier. The controlled static converter is coupled to the three phase network to result in a three phase drive with a greater speed range and a lower reactive power requirement as compared to subsynchronous static converter cascades.

8 Claims, 4 Drawing Figures

SPEED CONTROLLABLE DRIVE FOR AN ASYNCHRONOUS MOTOR

BACKGROUND OF THE INVENTION

This invention relates to speed controllable three phase drives in general and more particular to an improved speed controllable three phase drive of the type having an asynchronous motor with a slip ring rotor coupled to a three phase network and including a d.c. motor and fed through an uncontrolled rectifier connected to the slip rings of the asynchronous motor.

Arrangements of this general type referred to as three phase to d.c. mechine cascases are known, for example, from Siemens-Zeitschrift 1962, pages 710 to 714. In such cascades the speed of the drive is controlled through control of the excitation of the d.c. machine. As a result, at the maximum possible speed of the drive, the d.c. machine no longer delivers power. Thus, the asynchronous machine must always be designed for the full power. Since the asynchronous machine generates a high rotor at low speeds, while the d.c. motor generates a low counter emf, this known cascade arrangement is suitable only for relatively small speed ranges.

Another cascade is disclosed in ETZ, edition A, vol. 82, 1961, pages 589–596, and is referred to as a subsynchronous static converter. In this device, the slip power of the asynchronous motor is fed back into the three-phase network through a controlled static converter. With such a subsynchronous static converter cascade it is possible to obtain a relatively large speed range but at a corresponding large cost. The reactive power of the subsynchronous static converter cascade, which is made up of the reactive power of the machine, the comutation reactive power of the rectifier and the control reactive power of the static converter is, however, the greatest when compared with all other speed controllable drives.

In view of these deficiencies in prior art drives the need for an improved speed controllable three phase drive of the general type mentioned above which can be implemented at low cost and will result in the lowest possible reactive power requirement and which is capable of operating over a large speed range becomes evident.

SUMMARY OF THE INVENTION

The present invention provides such a drive. In accordance with the present invention, a controlled static converter is coupled to the three phase network and is placed in series with the uncontrolled rectifier used in the feed circuit of the d.c. motor. It is preferred that the d.c. motor be separately excited and that a line commutated controlled static converter be used in order to keep the cost of components low.

In the three phase drive of the present invention, the machine group comprising an asynchronous motor and a d.c. motor is utilized to a much greater extent than with the known three phase to d.c. cascade and provides a greater speed range. The controlled static converter can be utilized as a rectifier as well as an inverter. This results in reduced costs and lower reactive power requirements.

Preferably the d.c. motor is replaced by its equivalent in the form of a three phase synchronous motor set fed by a controlled inverter with the inverter connected in series with the uncontrolled rectifier and controlled static converter. The inverter can be coupled between the uncontrolled rectifier and the controlled static converter.

A three phase synchronous motor which is fed by an inverter is also known as a static converter motor and is disclosed, for example, in Siemens-Zietschrift 45, 1971, pages 177–182. It is electrically equivalent to a separately excited d.c. machine, with the mechanical commutator of the machine replaced by an electronic commutator in the inverter. Preferably the inverter is load controlled thereby achieving an economical implementation. Through the use of the static converter motor there is no limitation on the rated load, which in d.c. is limited by the lamination voltage of the commutator and by the centrifugal forces occurring at the commutator. The three-phase to three-phase machine cascade of the present invention can thus also be used at high speeds with high drive powers. As an example, it can be economically used as an adjustable drive for boiler feed pumps in power plants which previously used mostly turbine drives.

DETAILED DESCRIPTION OF THE PREFERRED EMBODIMENT

Figure 1:
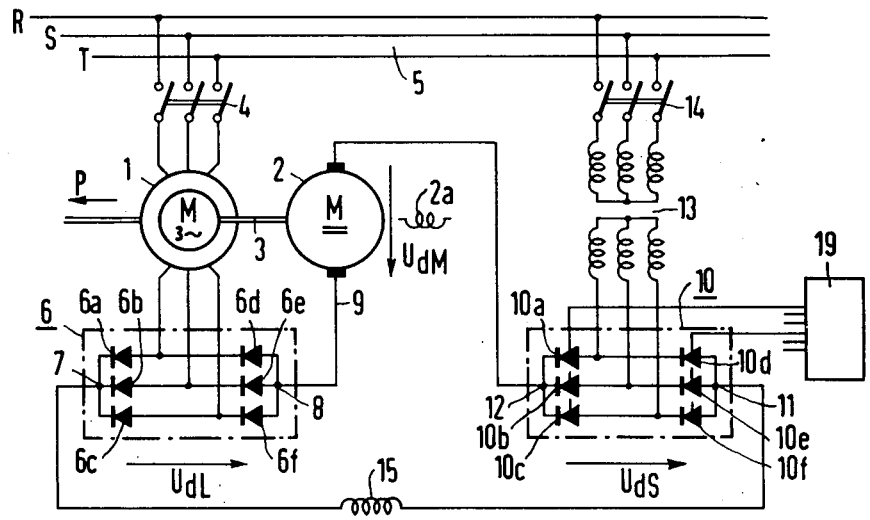
FIG. 1 is a circuit diagram illustrating a first embodiment of the present invention utilizing a separately excited d.c. motor.

FIG. 1 is a circuit diagram of a first embodiment of the present invention in the form of a three phase to d.c. machine cascade with the controlled static converter in the armature circuit of the d.c. motor. Such a motor can be used to great advantage as a pump or blower drive. The machine group comprises a three phase asynchronous motor 1 having a slip ring rotor and d.c. motor 2 with separate excitation 2a. The asynchronous motor 1 and the d.c. motor 2 are mechanically coupled by means of a shaft 3. It will be recognized that coupling need not be direct in the manner shown but can also be through a transmission or where the drive system is used in a vehicle, through the road way i.e. the two motors can be coupled to separate axles of the vehicle. The asynchronous motor 1 is coupled to the three phase network 5 through a switch 4. Through this arrangement, the three phases are R, S and T of the network 5 are fed to the armature of motor 1. As noted, the motor is a slip ring motor having a slip ring rotor with the three phases from the rotor taken off to an uncontrolled rectifier 6. Rectifier 6 is a three phase bridge circuit made up of the rectifiers 6a–6f which can be conventional diodes of a proper voltage and current rating. The d.c. terminals 7 and 8 of the rectifier 6 are coupled to the feed circuit 9 for the armature of the motor 2. The terminal 8 is coupled directly to the motor armature with the terminal 7 coupled through a choke 15 and the controlled static converter 10 to the other side of the armature. By means of the uncontrolled rectifier 6, the rotor current of the synchronous motor 1 is rectified and supplied to the armature circuit 9 of the d.c. motor 2.

The static converter 10 has terminals 11 and 12 with the terminal 11 coupled through the choke 15 to the terminal 7 of the rectifier 6 and terminal 12 to the armature of motor 2. Controlled converter 10 has an a.c. side coupled through a transformer 13 and three phase switch 14 to the three-phase network 5. If the drive design is of the proper nature (different types of designs will be described below) the switches 4 and 14 can be ganged together. The choke 15 in the circuit is used to smooth the d.c. current from the rectifier 6. The controlled converter 10 will preferably be a line commutated converter. Such a design results in the lowest cost of components. In conventional fashion, the converter is controlled by control means 19. The control means 19 provides the necessary ignition pulses to the individual controlled rectifier devices $10a - 10f$ which are arranged within the converter 10 in a conventional three phase bridge configuration. It should also be noted that the converter 10 may comprise a plurality of converters connected in series or parallel. The rectifiers used, i.e. the rectifier $10a-10f$ may be thyristors, for example. Line commutated converters of this nature in the manner in which their firing pulses are derived are described in more detail in the book "Line Commutated Thyristor Converters" by G. Moltgen published by Siemens AG and Pitman Publishing Company, 1972. In particular, reference should be had to chapter VII, pages 301–307.

Figure 2:
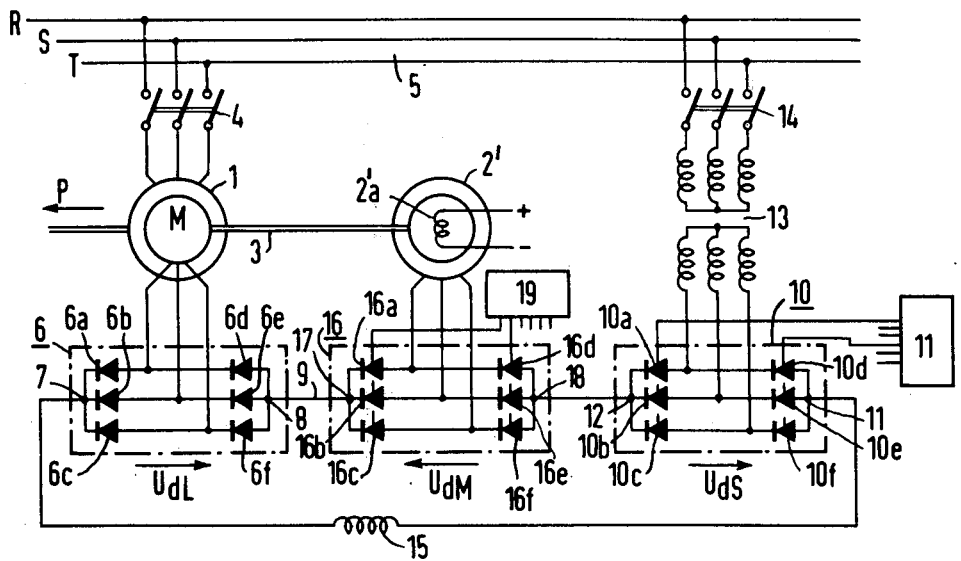
FIG. 2 is a similar diagram illustrating an embodiment in which the d.c. motor is replaced by a three phase synchronous motor fed by a controlled inverter.

FIG. 2 illustrates a second embodiment of the present invention utilizing a three-phase machine cascade. In this embodiment, the d.c. motor 2 of FIG. 1 is replaced with a synchronous motor 2' having a field winding $2'a$ and fed by a controlled converter 16. The remainder of the circuit is the same as that disclosed in connection with FIG. 1 and identical parts are given identical reference numerals. In this embodiment, the machine group comprising asynchronous motor 1 with its shaaft coupled to the shaft of synchronous motor 2'. In the feed circuit 9, the inverter 16 replaces the motor 2 of FIG. 1. The inverter 16 along with its load, the motor 2', is electrically equivalent to the d.c. motor 2 of FIG. 1. As illustrated, one d.c. input 17 of the inverter 16 is coupled to one of the d.c. outputs 8 of the rectifier 6. The other rectifier terminal 7 is coupled through the converter 10 to the other terminal 18 of the inverter 16. The output 12 of the converter 10 is coupled to the d.c. input 18 and the terminal 11 of the converter 10 to the terminal 7 of the rectifier 6. As illustrated, inverter 16 is a controlled inverter comprising controlled rectifiers $16a-16f$ arranged in a three phase bridge configuration. The a.c. output of the inverter 16 is coupled to the three phase input for the armature of the synchronous motor 2. As illustrated the field of the motor 2' is separately excited by a separate d.c. source. Through this arrangement, the inverter 16 inverts the rectified d.c. from the rotor of the motor 1 along with that from the converter 10 to provide an a.c. input for the synchronous motor 2. Associated with the inverter 16 is a control circuit 19 supplying the necessary ignition pulses to the controlled rectifiers $16a-16f$, which will preferably be thyristors. In this arrangement a gating control is not necessary. More detailed information regarding construction of the control circuit 19 may be had from the above cited reference. It is most economical if the inverter 16 is load controlled. In such a case it may be necessary to provide a commutation aid for the lower speed range. This may be accomplished, for example, through an appropriate modulation of the static converter 10.

Figure 3:
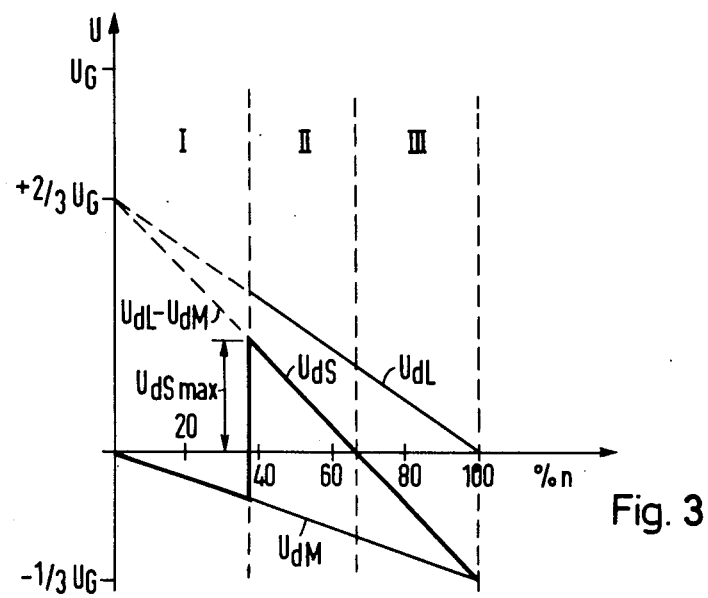
FIG. 3 is a diagram helpful in understanding the operation of the arrangement of FIGS. 1 and 2.

The manner in which the control of the present invention operates will be described in connection with FIG. 3. In FIG. 3, the d.c. voltage U in the armature circuit 9 of the embodiment of FIG. 1 or the d.c. circuit 9 of the embodiment of FIG. 2 is plotted with respect to speed in percent of nominal speed N. It should be noted at the outset that the power P delivered at the shaft of the machine group 1 and 2 or 2' is made up of the mechanical power of the asynchronous motor 1 and of the d.c. motor 2 or the synchronous motor 2'. The power percentage of the individual motors is determined by the specific arrangement and depends on the speed torques characteristics of the machine to be driven and on the required speed range.

For sake of an example a speed control for a blower drive with a quadratic torque pattern for speed ranges from the nominal speed $n$ of the asynchronous motor down to standstill will be used. In such an example, the nominal power of the asynchronous motor is ⅔ and that of the d.c. machine 2 or synchronous 2' ⅓ of the power delivered to the drive at top speed. Since the rectified rotor current obtained from the rectifier 6 flows through the armature of the d.c. machine 2, or through the inverter 16 of the static converter 2', the ratio of the rectified rotor standstill voltage $U_{dL}$ at constant excitation to the armature voltage $U_{dM}$ of the d.c. machine 2 or to the voltage $U_{dM}$ across the inverter 16 in the d.c. circuit 9 at nominal speed represents the relationship or ratio between the mechanical power components of the two motors, i.e. in the selected example the relationship is ⅔ to ⅓ or 2:1. In FIG. 3, $U_G$ represents the sum of the rectified rotor standstill voltage plus the d.c. voltage of the machine 2 at nominal speed or respectively the sum of the rectifier rotor standstill voltage plus the voltage drop across inverter 16 at nominal speed. For purposes of standardization, $U_G$ is set equal to 1. The straight line $U_{dL}$ characterizes a slope of the voltage $U_{dM}$ of the inverter 16.

The rectified rotor voltage $U_{dL}$ is counter acted by the EMF of the d.c. machine 2 or by the inverter voltage $U_{dM}$. The sum of these two voltages which are in opposite directions, i.e. $U_{dL}$ minus $U_{dM}$ must be supplied by the static converter 10 which is also in the d.c. circuit 9. The drive will take a speed at which the sum $U_{dL}$ minus $U_{dM} = U_{ds}$ where $U_{ds}$ is the voltage generated by the converter 10. The voltage $U_{ds}$ at the converter 10 is determined by is modulation. Through appropriate modulation, any speed can be obtained with adjustment continuous within certain ranges designated I, II and III on the figure. The voltage curve obtained by such regulation is indicated by a bold line on FIG. 3. In the upper speed range designated III on FIG. 3 and which is characterized by the absolute value of $U_{dL}$ being less than the absolute value of $U_{dM}$ and which represents the speed range between 66%M and M, the static converter 10 is modulated to give rectifier operation. In the middle range II where the absolute value of $U_{dL}$ is greater than the absolute value of $U_{dM}$ and which covers the range of 35%n to 66%n converter 10 is modulated to give inverter operation. In the bottom range I which extends from 0%n to 37%n and $U_{dL} - U_{dM}$ is greater than $U_{dmax}$ switch 4 is opened and the d.c. motor 2 or static converter motor 2' operated alone. Such is possible, for example, operating a blower or the like where the torque required for the device being driven is less than permissable torque of the d.c. machine 2 or of the synchronous machine 2'. At an adequate modulation range of the static converter 10 or if a starter is connected to the slip rings of the asynchronous motor 1, range I can be eliminated. In such a case a separate disconnection of the asynchronous motor 1 need not be provided and the switches 4 and 14 can be ganged together.

It is evident from FIG. 3 that, for the example given, even over the full speed range, the static converter 10, which is the main determining price factor, need be designed for only 30% of the total drive power, i.e. $U_{dSmax}$ is only ⅓ of $U_G$.

Figure 4:
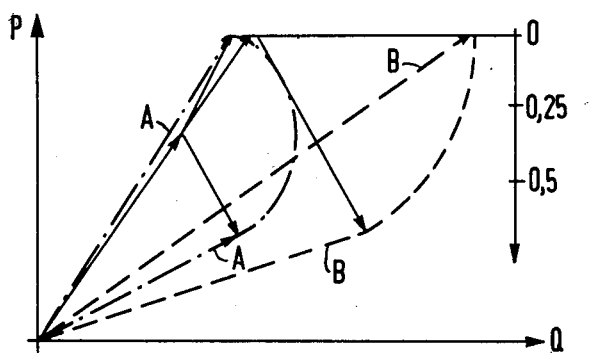
FIG. 4 is a vector diagram comparing the reactive power requirement of the arrangement of the present invention with that of the art arrangement.

FIG. 4 illustrates the effective power P and reactive power Q plotted in the form of a vector diagram. The vector diagram shows the sum, obtained $a+$ constant torque, of the power absorbed by motor 1 and by converter 10 from the three phase network 5 as a function of slip. The curve marked A corresponds to the three-phase drive of the present invention and the curve B to a subsynchronous static converter cascade. The present design of the asynchronous machine 1 for partial power and the reduced converter power, when compared with the usual subsynchronous static converter cascade, clearly leads to a reduction of the reactive power because of the better utilization of the available hardware.

In summary, it should be noted that with three phase drive of the present invention a large speed range is obtained with low reactive power requirements and without substantial increase in cost. Both the three phase to d.c. machine cascade and the three phase to three phase machine cascade of the present invention show advantages over the known three phase to d.c. cascade as well as over the subsynchronous static converter cascade without the disadvantages asssociated with those arrangements. Furthermore, the second embodiment, i.e. a three phase to three phase machine cascade, at least, can also be used in high power ranges, e.g. in power ranges above 15 MW. It should also be noted the present invention may be used to increase the speed range and the drive of existing three phase cascades through installation of controlled static converters 10 without alteration of the motor. In other words a modification from the conventional arrangement to that of the present invention can be carried out in simple fashion. These and other modifications can be accomplished without departing from the spirit of the invention which is intended to be limited solely by the appended claims.

I claim:

1. A speed controllable three phase drive comprising:
   a. an asychronous motor having a slip ring rotor;
   b. means for coupling the stator of said asynchronous motor to a three phase network;
   c. a three phase synchronous motor having its shaft mechanically coupled to the shaft of said asynchronous motor;
   d. an uncontrolled rectifier having its a.c. input coupled to the slip rings of said asynchronous motor;
   e. a controlled inverter made up of a plurality of controlled rectifiers in a bridge arrangement feeding said three phase synchronous motor with its a.c. output; and
   f. a controlled static converter having an a.c. input coupled to said three phase network, the d.c. terminals of said controlled static converter, said controlled inverter and said rectifier coupled in series with each other.

2. Apparatus according to claim 1 wherein said uncontrolled rectifier comprises a plurality of rectifiers in a bridge arrangement.

3. Apparatus according to claim 1 wherein said controlled static converter comprises a plurality of rectifiers in a bridge arrangement.

4. Apparatus according to claim 3 wherein said controlled converter is a line commutated converter.

5. Apparatus according to claim 1 and further including a choke in the series circuit making up the feed circuit for said means having the characteristic of a d.c. motor.

6. Apparatus according to claim 1 wherein said controlled static converter is coupled to three phase network through a transformer.

7. Apparatus according to claim 1 wherein said means coupling the stator of said asynchronous motor to the three phase network comprises a switch and further including an additional switch, independently operated, coupling said controlled static converter to said three phase network.

8. Apparatus according to claim 1 wherein said inverter is load controlled.

* * * * *